United States Patent [19]
Takano et al.

[11] Patent Number: 5,763,545
[45] Date of Patent: Jun. 9, 1998

[54] POLYMERIZATION APPARATUS AND A METHOD FOR PRODUCING POLYMER USING THE SAME

[75] Inventors: Masatsugu Takano; Tadashi Amano; Yoshihiko Hirai; Yoshitaka Okuno, all of Kamisu-machi, Japan

[73] Assignee: Shin-Etsu Chemical Co., Ltd., Tokyo, Japan

[21] Appl. No.: 527,903

[22] Filed: Sep. 14, 1995

[30] Foreign Application Priority Data

Sep. 14, 1994 [JP] Japan .................. 6-247099

[51] Int. Cl.$^6$ ............................ C08F 2/38
[52] U.S. Cl. .................. 526/82; 526/318; 526/344.2; 422/135; 422/136
[58] Field of Search ................ 526/344.2, 82, 526/83, 84, 85, 318; 422/135, 136

[56] References Cited

U.S. PATENT DOCUMENTS

| | | | |
|---|---|---|---|
| 4,125,574 | 11/1978 | Kastner et al. | 526/344.2 |
| 4,438,074 | 3/1984 | Wilt | 422/135 |
| 4,748,218 | 5/1988 | Sharaby | 526/344.2 |
| 4,752,640 | 6/1988 | Tomishima et al. | 526/344.2 |

FOREIGN PATENT DOCUMENTS

| | | |
|---|---|---|
| 0 421 184 | 4/1991 | European Pat. Off. . |
| 2 417 490 | 9/1979 | France . |
| 2 310 816 | 9/1974 | Germany . |
| 863055 | 3/1961 | United Kingdom . |

*Primary Examiner*—David W. Wu
*Attorney, Agent, or Firm*—Oblon, Spivak, McClelland, Maier & Neustadt, P.C.

[57] ABSTRACT

A polymerization apparatus comprising a cylindrical polymerization vessel having a straight cylindrical section, a cooling means for cooling the contents of the polymerization vessel, and paddle impellers, each fixed to a central shaft positioned along the center line of the vessel and spaced apart at predetermined positions, each impeller having impeller blades for agitating the contents inside the polymerization vessel as the shaft is rotated, wherein the polymerization vessel has an inner capacity of 100 m$^3$ or more and has a ratio L/D (the length L of the cylindrical section to the inner diameter D of the vessel) of at least 1.5, wherein three or more of the paddle impellers are arranged on and along said shaft in the center of the vessel, and wherein polymerization/inhibitor charge openings are arranged at positions on the interior surface of the wall of the polymerization vessel in such a manner that one charge opening is provided per paddle impeller at a position on the vessel wall which corresponds to the position of a paddle impeller along the shaft.

12 Claims, 2 Drawing Sheets

POLYMERIZATION APPARATUS AND A METHOD FOR PRODUCING POLYMER USING THE SAME

BACKGROUND OF THE INVENTION

1. Field of the Invention

This invention relates to a large-sized polymerization apparatus capable of diffusing rapidly a polymerization inhibitor after charging the same into the polymerization vessel of the apparatus and capable of stopping rapidly and completely polymerization reaction even when an abnormal reaction occurred in the vessel, and to a method for stopping polymerization using said apparatus.

2. Description of the Prior Art

Conventionally, as polymerization apparatuses used in suspension polymerization or the like of vinyl chloride type monomers, there are known polymerization apparatuses comprising a polymerization vessel provided with a cooling means, an agitator, a nozzle for charging raw materials, and a nozzle for withdrawing polymers, said cooling means being constructed of a cooling jacket and a reflux condenser. The above-mentioned cooling means is provided for the purpose of dissipating heat generated in the vessel during polymerization reaction since the polymerization reaction of vinyl monomers is an exothermic reaction. When an abnormal reaction occurred in the vessel or alternatively the same vessel came not to be cooled because of such as a breakdown of the cooling means, the reaction is immediately made stop in view of safety by charging a polymerization inhibitor into the polymerization vessel.

However, since polymerization vessels are recently large-sized for the purpose of improving productivity and especially, in a polymerization vessel having an inner capacity of more than 100 $m^3$, a polymerization initiator can not be homogeneously mixed and diffused in a short time, there is the disadvantage that either operations ranging from the charge of the inhibitor to the complete stop of the polymerization reaction are required a comparatively long time or a large amount of the inhibitor should be used.

SUMMARY OF THE INVENTION

An object of the present invention is to provide a polymerization apparatus capable of stopping polymerization reaction in a short time, even when a large-sized polymerization vessel is used, only by charging a less amount of an inhibitor into the polymerization vessel and capable of being operated safely even if, for example, an abnormal reaction occurred in the polymerization vessel or a cooling means was broken down, and a method for stopping polymerization reaction using the same apparatus.

In one aspect, the present invention provides a polymerization apparatus comprising a generally cylindrical polymerization vessel having a straight cylindrical section, a cooling means for cooling a content of the polymerization vessel, and paddle impellers, each having impeller blades, for agitating the content inside the polymerization vessel by being rotated on a center line, as the axis, of the cylindrical section of the polymerization vessel, wherein the polymerization vessel has an inner capacity of 100 $m^3$ or more and has a ratio L/D (the length L of the cylindrical section to the inner diameter D of the vessel) of 1.5 or more, wherein three or more of the paddle impellers are arranged on and along said center line, and wherein polymerization-inhibitor charge openings are provided at predetermined positions on the interior surface of the wall of the polymerization vessel in such a manner that each of said predetermined positions substantially corresponds to each of positions where the paddle impellers are arranged.

In another aspect, the present invention provides a method for producing a polymer, which comprises polymerizing a vinyl chloride monomer or a mixture of monomers containing the vinyl chloride monomer as a primary component in said polymerization apparatus and charging a polymerization inhibitor into said polymerization apparatus through said inhibitor charge openings thereof during polymerization.

According to the present invention, after a polymerization inhibitor was charged into the polymerization vessel, the inhibitor can be rapidly diffused therein, so that the polymerization reaction can be rapidly and completely stopped by a less amount of the inhibitor even when an abnormal reaction occurred in the vessel.

Moreover, according to the method of stopping polymerization of the present invention, the polymerization reaction can be completely stopped within 30 minutes after a polymerization inhibitor was charged into the polymerization vessel.

DETAILED DESCRIPTION OF THE PREFERRED EMBODIMENTS

The present invention will be hereinafter described in detail.

Polymerization Apparatus

Figure 1:
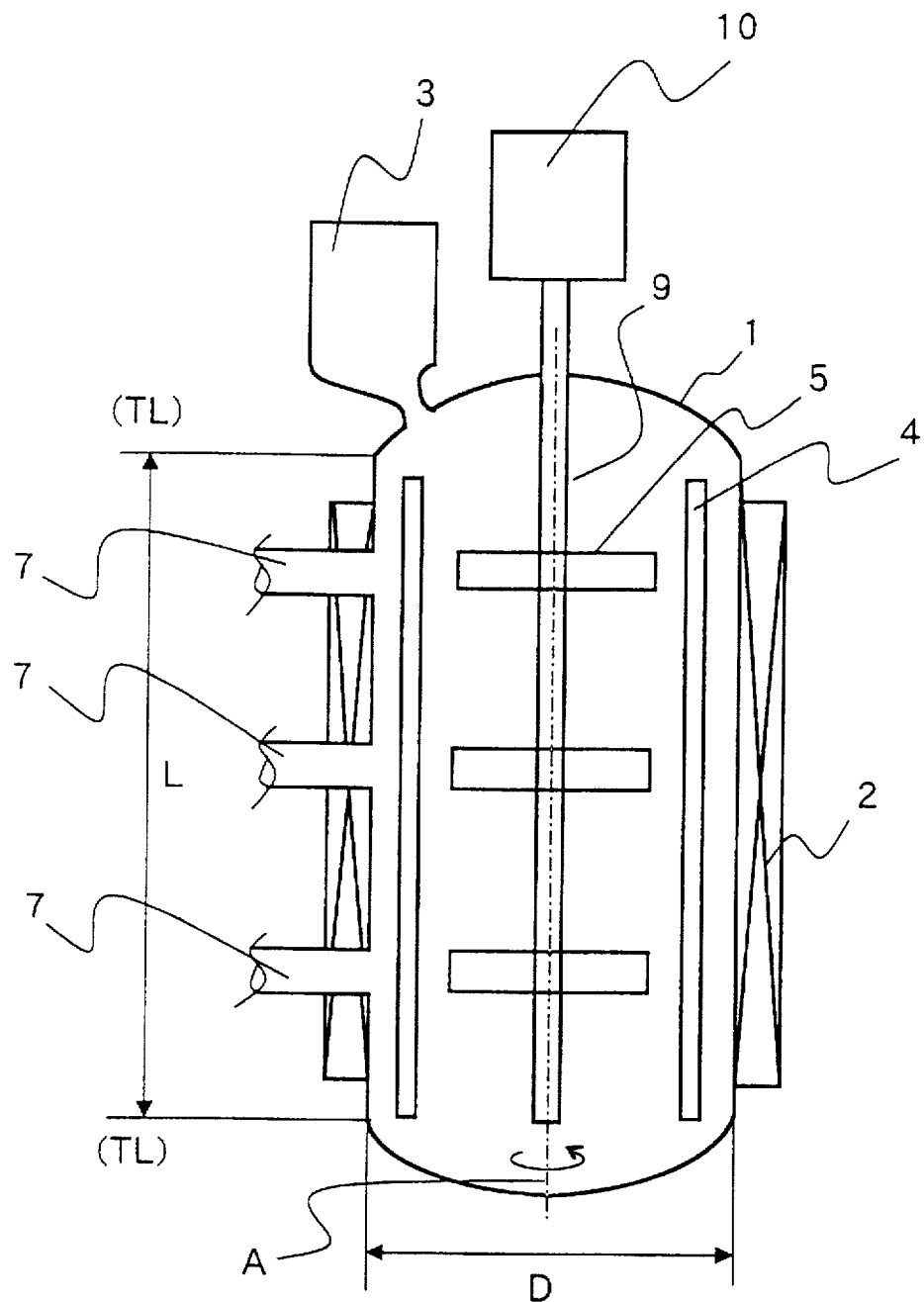
FIG. 1 is a schematic view showing an embodiment of the polymerization apparatus of the present invention.

The polymerization apparatus of this invention is, for example, as shown in FIG. 1, provided with a generally cylindrical polymerization vessel 1 having a straight cylindrical section, cooling means 2, 3 for cooling the content of the polymerization vessel, and paddle impellers 5, each having impeller blades, for agitating the content inside the polymerization vessel by being rotated on the center line A, as a shaft, of the cylindrical section of the polymerization vessel.

The polymerization vessel 1 used in the present invention is a large-sized vessel having an inner capacity of 100 $m^3$ or more, preferably 100 to 200 $m^3$. The ratio L/D of the length L of the cylindrical section to the inner diameter D of the polymerization vessel 1 is generally 1.5 or more, preferably 1.5 to 2.5, more preferably 1.7 to 2.0. If the ratio is less than 1.5, an efficient cooling can not be attained since cooling areas relative to the volume of the polymerization vessel decreases, while if the ratio is excessively large, a non-homogeneous mixing may occur between the upper and lower parts of the polymerization vessel.

As the cooling means used in the present invention, any known cooling means can be used singly or in a combination of two or more thereof without being particularly limited, as long as the content of the polymerization vessel can be cooled. For example, there can be enumerated, as shown in FIG. 1, a cooling jacket 2, which is provided on the exterior surface of the polymerization vessel, for passing through a cooling medium such as cooling water therein, and a reflux condenser 3, which is provided on the upper part of the polymerization vessel, for condensing monomer vapor generated in the polymerization vessel to reflux the condensed vapor in the same vessel. The reflux condenser 3 used in the present invention has preferably 5% or more, particularly 5 to 50%, in an amount of heat dissipation obtained by the reflux condenser 3, based on the total amount of heat generated during polymerization.

Figure 2:
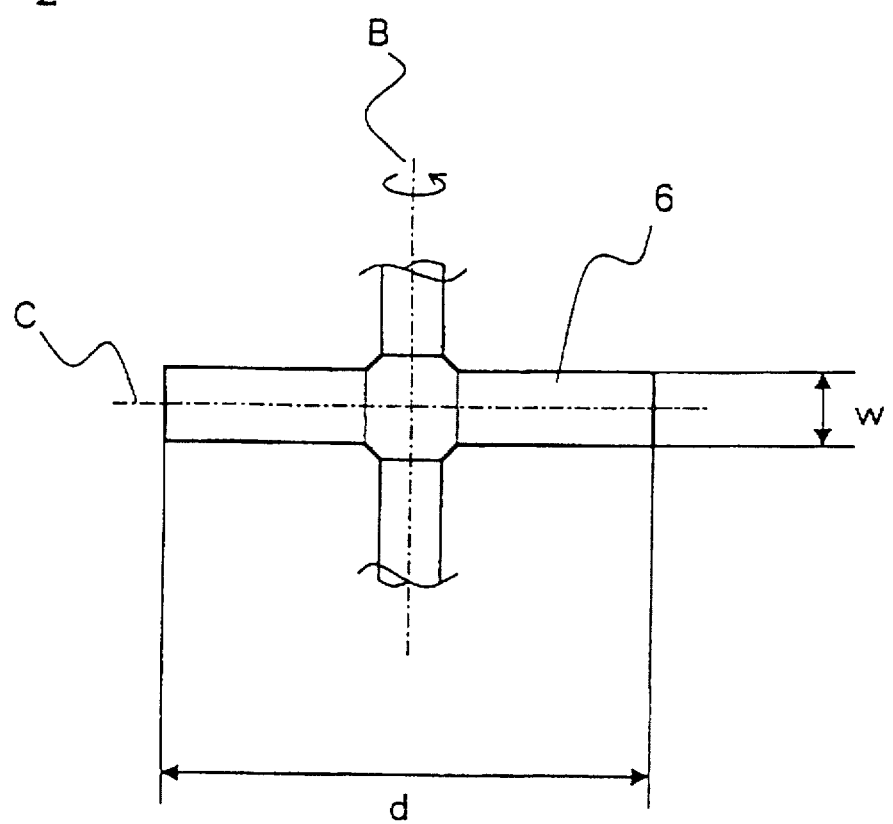
FIG. 2 is a side view showing an embodiment of a paddle impeller used in the present invention.

The paddle impeller used in the present invention comprises, as shown in FIG. 2, an agitating impeller which is radially provided with a plurality of impeller blades 6 each being in the form of a plate and having a generally rectangular shape on a rotating shaft B as a center. These impeller blades 6 are arranged in such a manner that the surface of each of the plates is generally horizontal to the shaft B. The number of the blades 6 of each paddle impeller is usually 2 to 6, preferably 2.

Although the size of each impeller blade 6 is not particularly limited unless it affects adversely on rotating, the size is preferred to satisfy the following relations:

$0.35 \leq d/D \leq 0.55$ and $0.10 \leq n \cdot w/D \leq 0.16$ wherein D has the same meaning as above, d is an impeller diameter, w is a vertical width of the impeller blade 6 and n is the number of the paddle impeller 5.

In the present invention, 3 or more, preferably 3 to 5, of such paddle impellers 5 are arranged, as shown in FIG. 1, on and along the center line A (or axis) of the cylindrical section of the polymerization vessel. If the number of the paddle impellers 5 are 2 or less, it is not desired since a non-homogeneous mixing occurs between the upper and lower parts of the polymerization vessel and polymer scale is liable to be deposited on the inside of the polymerization vessel.

The positions to arrange or install the paddle impellers 5 are as follows: the lowermost paddle impeller is preferred to be such that the height of a center line C of the vertical width of the impeller blade is within the range of ±200 mm along the direction of the center line A of the cylindrical section from the lower end position TL (Tangential Line) of the cylindrical section of the polymerization vessel 1 as shown in FIG. 1 and FIG. 2 (hereinafter, said height with respect to each paddle impeller being referred to merely as "center line C"), while the uppermost paddle impeller is preferred to be such that the center line C of said uppermost paddle impeller is within the range of 0.35 L, wherein L has the same meaning as above, downwardly from the upper end position TL of the cylindrical section.

The other medium paddle impeller or impellers are preferred to be arranged in such a manner that the center line C of the medium paddle impeller is in the range of ±600 mm along the direction of the center line A of the cylindrical section from a position by which the distance between the center line C of the just upper paddle impeller and the center line C of the just lower paddle impeller, with respect to said medium paddle impeller, is equally divided. The paddle impellers 5 are installed at such arrangement positions on the shaft 9 arranged along the center line A of the cylindrical section, and the shaft 9 is connected to a driving means 10 such as an agitating motor for providing torque or rotation power to the shaft. The driving power of the driving means, namely, the agitation power of the paddle impellers is preferably 80 to 170 kg·m/s per weight (ton) of the content in the polymerization vessel. Incidentally, the arrangement position of the driving means may be any of the upper or lower part of the polymerization vessel.

The polymerization apparatus of the present invention has, as shown in Table 1, polymerization-inhibitor charge openings 7 on the interior surface of the polymerization vessel 1.

The positions to arrange said inhibitor charge openings 7 are on the interior surface of the polymerization vessel 1 and are not particularly limited as long as each of these positions substantially corresponds to each of positions where the paddle impellers 5 are arranged. The position of each of the inhibitor charge openings 7 is preferred to be such that the central position of said inhibitor charge opening is in the range of ±100 mm from the center line C of each blade impeller along the direction of the center line A of the cylindrical section. Each of the polymerization-inhibitor charge openings 7 is opened in the polymerization vessel through, for example, a tank valve, and the vicinity of the inhibitor charge opening inside the polymerization vessel is preferred to be as even as possible.

The number of the polymerization-inhibitor charge openings equals to the number of the paddle impellers and is 3 or more, preferably 3 to 5.

The polymerization apparatus of the present invention can mix homogeneously and rapidly a polymerization inhibitor after charging the inhibitor into the polymerization vessel, since the apparatus is provided with the paddle impellers 5 and the polymerization-inhibitor charge openings 7 as set forth above.

The polymerization apparatus according to the present invention is preferred to further provide a baffle or baffles in the polymerization vessel. The shape of the baffle is not particularly limited and the baffle can be used in the form of, for example, a plate or a pipe. The position to arrange the baffle and the number thereof are not also particularly limited and, for example, as shown in FIG. 1, there can be provided 1 to 8 of the baffles 4 along the direction of the center line A of the cylindrical section within the inner wall of the polymerization vessel. These baffles 4 may be hollow baffles with a cooling function capable of dissipating heat generated during polymerization reaction by passing water through the hollow section.

Materials for forming the inner surfaces of the polymerization vessel, the baffles, the paddle impellers, the shaft, etc., which are used in the polymerization apparatus of the present invention, are preferably a stainless steel, such as a high chromium high-purity ferrite type stainless steel, a two-phase stainless steel and an austenite type stainless steel.

Method for Producing Polymer

The method of stopping polymerization using the polymerization apparatus of the present invention is particularly preferable for use in polymerization of vinyl chloride.

Monomers to be used in polymerization of vinyl chloride include vinyl chloride type monomers, and otherwise a mixture of vinyl chloride, as a primary component (the vinyl chloride component being in an amount of 50% by weight or more), and other vinyl chloride type monomers copolymerizable therewith. vinyl type monomers (comonomers) to be copolymerized with vinyl chloride include, for example, vinyl esters, such as vinyl acetate and vinyl propionate; acrylic acid or its esters, such as acrylic acid, methyl acrylate and ethyl acrylate; methacrylic acid or its esters, such as methacrylic acid, methyl methacrylate and ethyl methacrylate; olefins, such as ethylene and propylene; maleic acid anhydride; acrylonitrile; styrene; α-methylstyrene; vinylidene chloride; and other monomers copolymerizable with vinyl chloride. They can be used singly or in a combination of two or more thereof.

Methods for polymerizing said monomers are not particularly limited, but the polymerization methods in the case of using the polymerization apparatus of the present invention include, preferably, methods for polymerizing these monomers in an aqueous medium, such as suspension polymerization and emulsion polymerization. In the polymerization, dispersion stabilizers and polymerization initiators, which are used in polymerizing vinyl chloride type monomers in an aqueous medium, can be added in a usual amount.

The above dispersion stabilizers include water-soluble cellulose ethers, such as methyl cellulose, hydroxyethyl cellulose, hydroxypropyl cellulose and hydroxypropylmethyl cellulose; water-soluble partially-saponified polyvinyl alcohol; oil-soluble partially-saponified polyvinyl alcohol; acrylic acid polymers; water-soluble polymeric substances, such as gelatin; oil-soluble emulsifiers, such as sorbitan monolaurate, sorbitan trioleate, glycerin tristearate and ethylene oxide-propylene oxide block copolymer; water-soluble emulsifiers, such as polyoxyethylene sorbitan monolaurate, polyoxyethylene glycerin oleate and sodium laurate. They can be used singly or in a combination of two or more thereof.

The amount of these dispersion stabilizers added is generally 0.01 to 5 parts by weight per 100 parts by weight of the monomer charged.

The above polymerization initiators include percarbonate compounds, such as diisopropyl peroxydicarbonate, di-2-ethylhexyl peroxydicarbonate and diethoxyethyl peroxydicarbonate; perester compounds, such as t-butyl peroxypivalate, t-hexyl peroxypivalate, t-butyl peroxyneodecanoate and α-cumyl peroxyneodecanoate; peroxides, such as acetylcyclohexylsulfonyl peroxide, 2,4,4-trimethylpentyl-2-peroxyphenoxy acetate, 3,5,5-trimethylhexanoyl peroxide; azo compounds, such as azobis-2,4-dimethylvaleronitrile and azobis(4-methoxy-2,4-dimethylvaleronitrile); potassium persulfate; ammonium persulfate; and hydrogen peroxide. They can be used singly or in a combination of two or more thereof.

The amount of these polymerization initiators added is generally 0.01 to 3 parts by weight per 100 parts by weight of the monomer charged.

The method for stopping polymerization according to the present invention comprises providing the polymerization apparatus of the present invention and charging a polymerization initiator during polymerization reaction of, for example, said vinyl chloride type monomer into the polymerization vessel through the polymerization-inhibitor charge openings 7 as shown in FIG. 1.

As the polymerization inhibitors, any conventionally known polymerization inhibitors can be used singly or in a combination of two or more thereof. These polymerization inhibitors include reaction control agents such as, for example, 2,2-di-(4'-hydroxyphenyl)propane; hydroquinone; p-methoxyphenol; tert-butylhydroxyanisole; n-octadecyl-3-(4-hydroxy-3,5-di-tert-butylphenyl) propionate; 2,5-di-tert-butylhydroquinone; 4,4'-butylidene-bis(3-methyl-6-tert-butylphenol); 3,5-di-tert-butyl-4-hydroxytoluene; 2,2-methylene-bis(4-ethyl-6-tert-butylphenol); triethylene glycol-bis[3-(3-tert-butyl-5-methyl-4-hydroxyphenyl) propionate]; pentaerythrityl-tetrakis[3-(3,5-di-tert-butyl-4-hydroxyphenyl)propionate]; tert-butyl catechol; 4,4'-thiobis (6-tert-butyl-m-cresol); tocopherol phenol type compounds; N-oxide compounds such as sodium nitrite; and sulfur compounds.

The time to charge the polymerization inhibitor is when it is required to rapidly and completely stop polymerization during polymerization, for example, when the temperature of the mixture present in the polymerization vessel can not be controlled within a proper temperature range by such as the breakdown of the cooling means and when an increase in the reaction temperature can not be controlled by such as an abnormal reaction.

Although the amount of the polymerization inhibitor charged can not be sweepingly determined depending on the kind of the inhibitor used, the amount is generally 150 ppm or more, preferably 170 to 5,000 ppm, based on the weight of the monomer charged. If the charged amount is too small, the polymerization may not be rapidly and completely stopped.

The aqueous medium used in the polymerization of vinyl chloride type monomers includes, in general, deionized water. If necessary, to the polymerization system, there can be added, for example, polymerization regulators, chain transfer agents, pH adjusters, gelling improvers, antistatic agents, crosslinking agents, stabilizers, fillers, anti-oxidants, buffers, and anti-scaling agents, which are suitably used in the polymerization of vinyl chloride type monomers.

The other conditions and the methods for charging the aqueous medium, the vinyl chloride monomer and, if necessary, the other comonomers, the suspension stabilizer, the polymerization inhibitor, or the like into the polymerization vessel, which are used in this polymerization, may be similar to the conventional conditions and methods, and the conditions, for example, each amount of these substances to be charged may be also similar to the conventional conditions. The polymerization temperature may be in the same temperature range, 20° to 80° C., as in the usual polymerization of vinyl chloride.

EXAMPLES

The present invention will be more specifically described with reference to Examples and Comparative Examples.

Example 1

A polymerization apparatus, as shown in FIG. 1, was constructed, which was provided with a polymerization vessel 1, a cooling jacket 2, a reflux condenser 3, baffles 4, paddle impellers 5, polymerization-inhibitor charge openings 7 and a driving means 10. Incidentally, the inner capacity of the polymerization vessel was 130 m$^3$, the inner diameter D was 4,200 mm, and the length L of the straight cylindrical section was 7,900 mm (L/D=1.88). Three paddle impellers 5 were arranged as shown in FIG. 1, each of the paddle impellers having two impeller blades as shown in FIG. 2. The polymerization-inhibitor charge openings 7 were arranged at three-predetermined positions in such a manner that the central position of each of the charge openings conforms to the height of the center line C of each paddle impeller.

Into the polymerization vessel 1 of such a polymerization apparatus, 57,500 kg of ion-exchanged water, 13.8 kg of a partially saponified polyvinyl alcohol, and 9.2 kg of hydroxymethyl cellulose were charged. After the inside of the vessel was evacuated by means of a vacuum pump the inner pressure within the vessel became 60 mmHg, 46,000 kg of vinyl chloride monomer was charged into the vessel, and then 25.3 kg of di-2-ethylhexyl peroxydicarbonate as a polymerization initiator was pressure-charged therein while agitating the content with the paddle impellers 5, followed by passing a hot water through the cooling jacket 2 to carry out polymerization reaction at 53° C. Incidentally, the agitation power of the paddle impellers due to the driving means 10 at the beginning of the polymerization was 130 kg·m/s per weight (ton) of the content in the polymerization vessel.

Thereafter, at the time when the inner pressure dropped to 7.0 kg/cm$^2$ (gauge pressure), 350 ppm of 2,2-di-(4'hydroxyphenyl) propane per weight of the charged monomer (the total amount of the polymerization inhibitor being 1,050 ppm per weight of the charged monomer) was simultaneously pressure-charged into the vessel through each of three polymerization-inhibitor charge openings 7. As a result, even when 30 minutes passed after the polymerization inhibitor was charged, the inner pressure was not changed and it could be confirmed that the polymerization reaction was stopped.

Example 2

After a similar polymerization reaction was carried out using the same polymerization apparatus as in Example 1, 70 ppm of sodium nitrite, in stead of 2,2-di-(4'hydroxyphenyl)propane, per weight of the charged monomer (the total amount of the polymerization inhibitor being 210 ppm per weight of the charged monomer) was simultaneously pressure-charged into the vessel through each of the three polymerization-inhibitor charge openings 7. As a result, even when 30 minutes passed after the polymerization inhibitor was charged, the inner pressure was not changed and it could be confirmed that the polymerization reaction was stopped.

Comparative Example 1

A similar polymerization reaction was carried out using the same polymerization apparatus as in Example 1, except that only two of the three polymerization-inhibitor charge openings 7 were installed such that the one charge opening is arranged at the middle position between the center line C of the uppermost paddle impeller and the center line C of the medium paddle impeller and the other charge opening is arranged at the middle position between the center line C of the medium paddle impeller and the center line C of the lowermost paddle impeller. In this case, 525 ppm of the 2,2-di-(4'-hydroxyphenyl)propane per weight of the charged monomer (the total amount of the polymerization inhibitor being 1,050 ppm per weight of the charged monomer) was simultaneously pressure-charged into the polymerization vessel through each of the two polymerization-inhibitor charge openings 7. As a result, when 30 minutes passed after the polymerization inhibitor was charged, the inner pressure was dropped to 1.0 kg/cm² (gauge pressure).

What is claimed is:

1. A method for stopping polymerization, which comprises:

batchwise polymerizing a vinyl chloride monomer or a mixture of monomers containing the vinyl chloride monomer as a primary component in a batchwise polymerization apparatus comprising a cylindrical polymerization vessel having a straight cylindrical section, a cooling means for cooling the contents of the polymerization vessel comprising a cooling jacket provided on the exterior surface of the wall of the polymerization vessel for passing therethrough a cooling medium in the jacket, and paddle impellors each fixed to a central shaft positioned along the center line of the vessel and spaced apart at predetermined positions, each impellor having impellor blades for agitating the contents inside the polymerization vessel as the shaft is rotated, wherein the polymerization vessel has an inner capacity of 100 m³ or more and has a ratio L/D (the length L of the cylindrical section to the diameter D of the vessel) of 1.5 or more, wherein three or more of the paddle impellers are arranged on and along said shaft in the center of the vessel and wherein polymerization-inhibitor charge openings are arranged at positions on the interior surface of the wall of the polymerization vessel in such a manner that one charge opening is provided per paddle impeller at a position on the vessel wall which corresponds to the position of a paddle impeller along said shaft; and charging a polymerization inhibitor into the polymerization apparatus through the polymerization-inhibitor charge openings thereof.

2. A method according to claim 1, wherein the mixture of monomers is formed of the vinyl chloride monomer and at least one comonomer selected from the group consisting of vinyl esters, acrylic acid and its esters, methacrylic acid and its esters, olefins, maleic acid anhydride, acrylonitrile, styrene, α-methylstyrene and vinylidene chloride.

3. A method according to claim 1, wherein the polymerization is carried out in an aqueous medium in the presence of a polymerization initiator and a dispersion stabilizer in accordance with suspension polymerization or emulsion polymerization.

4. A method according to claim 1, wherein the amount of the polymerization inhibitor charged is 150 ppm or more per weight of the vinyl chloride monomer or the mixture of monomers.

5. A method according to claim 1, wherein the polymerization temperature is in the range of 20° to 80° C.

6. A method for stopping polymerization, which comprises:

batchwise polymerizing a vinyl chloride monomer or a mixture of monomers containing the vinyl chloride monomer as a primary component in a polymerization apparatus comprising a cylindrical polymerization vessel having a straight cylindrical section, a cooling means for cooling the contents of the polymerization vessel, which comprises a reflux condenser provided on an upper part of the polymerization vessel for condensing and returning refluxing monomer vapor which is generated in the polymerization vessel to the polymerization vessel, and paddle impellers each fixed to a central shaft positioned along the center line of the vessel and spaced apart at predetermined positions, each impeller having impeller blades for agitating the contents inside the polymerization vessel as the shaft is rotated, wherein the polymerization vessel has an inner capacity of 100 m³ or more and has a ratio L/D (the length L of the cylindrical section to the inner diameter D of the vessel) of 1.5 or more, wherein three or more of the paddle impellors are arranged on and along said shaft in the center of the vessel and wherein polymerization-inhibitor charge openings are arranged at positions on the interior surface of the wall of the polymerization vessel in such a manner that one charge opening is provided per paddle impeller at a position on the vessel wall which corresponds to the position of a paddle impeller along said shaft; and charging a polymerization inhibitor into the polymerization apparatus to polymerization-inhibitor-charge openings thereof.

7. A method according to claim 6, wherein the mixture of monomers is formed of the vinyl chloride monomer and at least one comonomer selected from the group consisting of vinyl esters, acrylic acid and its esters, methacrylic acid and its esters, olefins, maleic acid anhydride, acrylonitrile, styrene, α-methylstyrene and vinylidene chloride.

8. A method according to claim 6, wherein the polymerization is carried out in an aqueous medium in the presence of a polymerization initiator and a dispersion stabilizer by suspension polymerization or emulsion polymerization.

9. A method according to claim 6, wherein the amount of the polymerization inhibitor charged is 150 ppm or more per weight of the vinyl chloride monomer or the mixture of monomers.

10. A method according to claim 9, wherein the agitation power of the impellers is 80 to 170 kg·m/s per weight (ton) of the content in the polymerization vessel.

11. A method according to claim 6, wherein the polymerization temperature is in the range of 20° to 80° C.

12. A method according to claim 9, wherein the amount of the polymerization inhibitor is 170 to 5,000 ppm per weight of the vinyl chloride monomer or the mixture of monomers.

* * * * *